(No Model.) 2 Sheets—Sheet 1.

J. QUILLMANN.
MACHINE FOR CLEANING MALT.

No. 370,493. Patented Sept. 27, 1887.

WITNESSES:
A. Schehl.
Carl Karp

INVENTOR
Jakob Quillmann
BY
Goepel & Raegener
ATTORNEYS.

(No Model.) 2 Sheets—Sheet 2.

J. QUILLMANN.
MACHINE FOR CLEANING MALT.

No. 370,493. Patented Sept. 27, 1887.

WITNESSES:
A. Schehl.
Carl Nash

INVENTOR
Jakob Quillmann
BY
ATTORNEYS.

UNITED STATES PATENT OFFICE.

JAKOB QUILLMANN, OF NEW YORK, N. Y.

MACHINE FOR CLEANING MALT.

SPECIFICATION forming part of Letters Patent No. 370,493, dated September 27, 1887.

Application filed November 17, 1886. Serial No. 219,121. (No model.)

*To all whom it may concern:*

Be it known that I, JAKOB QUILLMANN, of the city, county, and State of New York, have invented certain new and useful Improvements in Machines for Cleaning Malt, of which the following is a specification.

This invention relates to machines for cleaning malt preparatory to crushing the same for mashing it in the brewing process.

Figure 1:
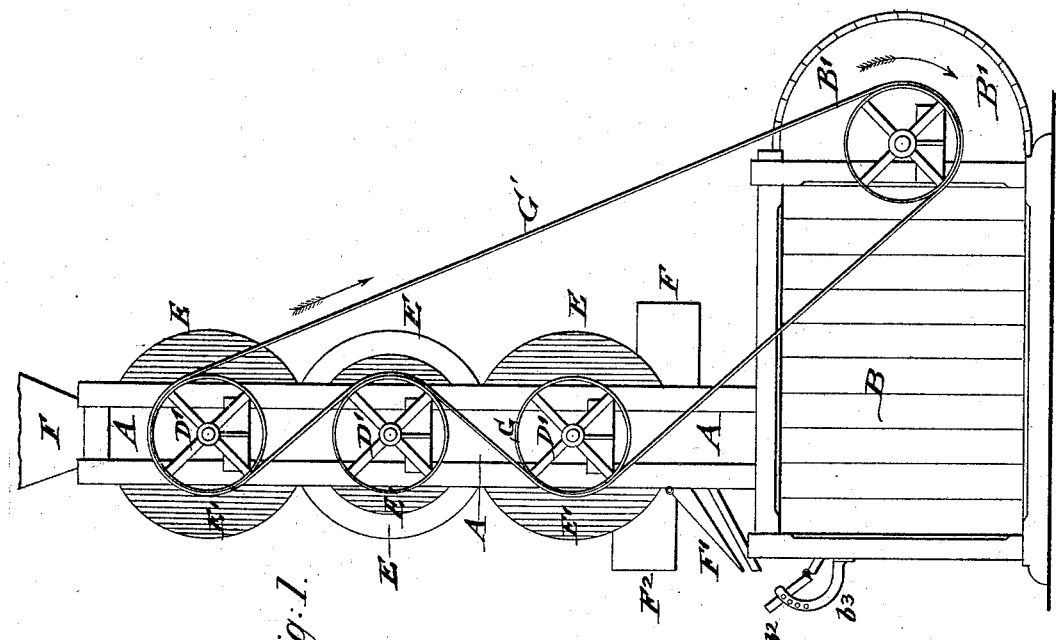
Figure 2:
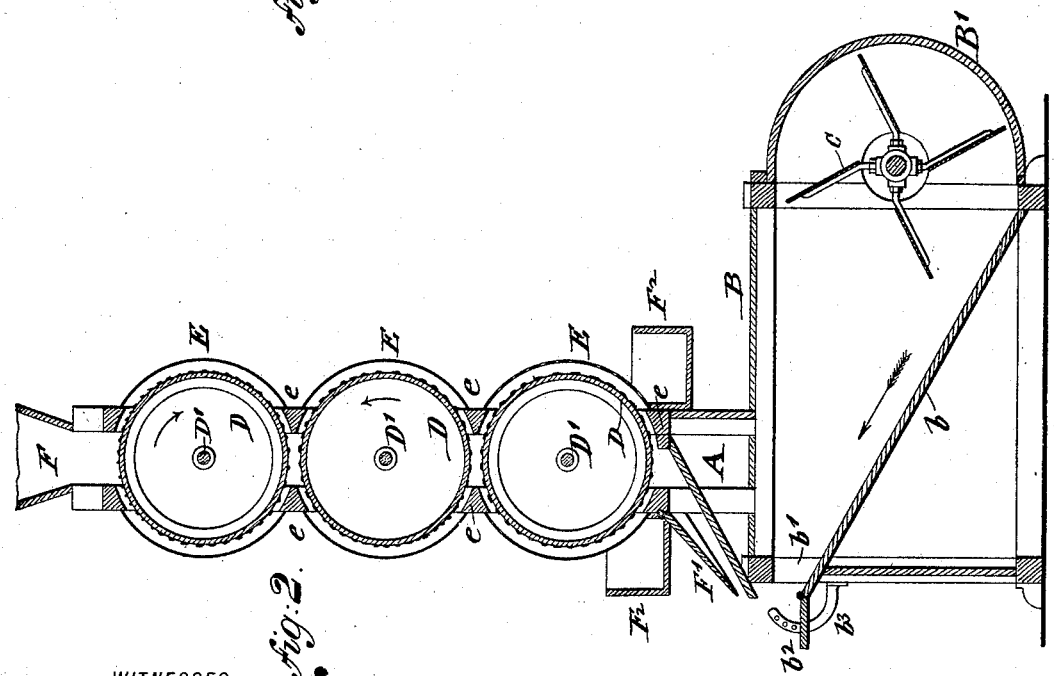
Figure 3:
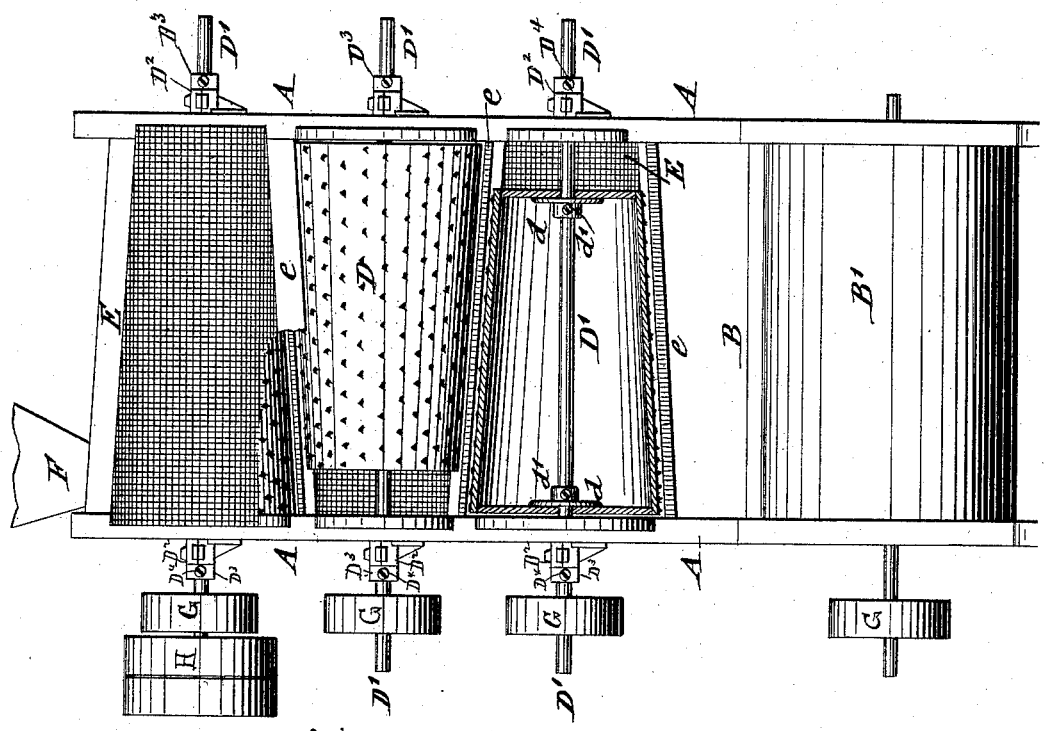

In the accompanying drawings, forming a part of this specification, Figure 1 represents an end elevation of my improved machine for cleaning malt. Fig. 2 is a transverse vertical section thereof. Fig. 3 is a side elevation thereof, partly in vertical transverse section and partly broken away.

A A in the drawings represent the upright standards of the supporting-frame of the machine, which standards are mounted on an oblong casing, B, that forms the base of my improved machine. The box-shaped casing B is provided with an inclined bottom, $b$, with a narrow opening, $b'$, at one end, and with a semicircular fan-casing, B', at the other end. A rotary fan, C, is located in the fan-casing and produces a strong blast of air, which passes along the inclined bottom $b$ and through the opening $b'$. The size of this opening is regulated by a hinged gate, $b^2$, which is adjustable on arc-shaped brackets $b^3$, as shown clearly in Figs. 1 and 2. The upright standards A A are provided with journal-bearings $D^2$, in which are journaled the shafts $D'$ of a number of rotary screens or drums, D, the construction of which will be hereinafter described. Collars $D^3$ are secured to said shafts $D'$ by means of set-screws $D^4$, outside said bearings $D^2$, whereby the said shafts may be adjusted endwise in their bearings. The shafts, moreover, are provided on their projecting ends at one side of the machine with pulleys G, over and around which a suitable driving-belt, G', is passed, one of said shafts being also provided with a driving-pulley, H.

The drums are constructed in the form of truncated cones, with solid heads at each end, one of which is smaller in diameter than the other, and between such heads the drums are roughened on their exteriors. Internally the heads are attached to the shafts by means of collars $d$ and set-screws $d'$. The drums are placed one above another, and in such relation that the larger end of one drum will be opposite the smaller end of the adjacent drum.

The drums D are inclosed by segmental screens E, that are made concentric to the drums and attached to fixed beveled strips $e\ e$, that extend transversely between the standards A A. The screens E are made of loosely-meshed wire-cloth, the individual wires of which are preferably of square cross-section, so as to exert by their angular corners a greater degree of friction on the malt that is passed through between the screens and drums. The strips are beveled, so as not to obstruct the passage of the malt from one drum to the other. The screens E E are closed at the ends by disk-shaped heads E', attached to the standards A A, as shown in Figs. 1 and 3. The malt is supplied to the larger end of the upper drum through a hopper, F, at the top of the supporting-frame, and thence it passes through the slotted top beam of the frame onto said drum. Upon this drum it is carried half-way round in close contact with the upper screen E, and thence it passes through the space between the two upper drums and falls upon the next lower drum. The drums are rotated alternately in opposite directions by means of the passage of the belt heretofore referred to over the operating-pulleys in a serpentine course. The malt passes thence half around the second drum and is delivered upon the third, and so on down to the bottom of the series. The centrifugal force of each drum tends to cause the malt to travel from its smaller to its larger end, and by the relative disposition of the drums with the larger end of one opposite the smaller end of the next the malt is made to traverse to a certain extent alternately in opposite directions, the machine thereby affording a long route for the malt within a compact space. By adjusting the shafts $D'$ longitudinally in their bearings the distance between the faces of the drums, owing to their relative arrangement, and between the face of each drum and its screen, may be increased or decreased, whereby the degree of friction exerted on the malt between the drums and screens, and between the oppositely-moving faces of adjacent drums, may be made greater or less. The high speed of rotation given the drums causes the malt to be distributed evenly over their surfaces and effects a rapid cleansing of the same. The impurities adhering to the malt are removed therefrom by its frictional contact with the screens. The finer impurities are passed through the screens to the outside, and are collected in transverse boxes F², arranged below the lower drum and screen, said boxes being made of sufficient width to receive the screenings dropped from all the screens. Below the lower drum an inclined discharge-spout, F', is supported by the lower strips, e, and this spout delivers the cleansed malt into the path of the fan-blast, heretofore described. By passing the cleansed malt through the air-current created by the fan it is finally cleansed of all the adhering dust and other smaller impurities, after which it may be collected in a suitable receptacle placed below the spout F'.

I claim—

1. The combination of rotary conical roughened drums arranged vertically one above another, the large end of one being adjacent to the small end of the next, and fixed segmental screens arranged concentrically to said drums.

2. The combination of rotary conical roughened drums arranged vertically one above another, the large end of one being adjacent to the small end of the next, means, substantially as described, for adjusting said drums longitudinally on their shafts, and fixed segmental screens arranged concentrically to said drums.

3. The combination of a supporting-frame, rotary conical roughened drums arranged vertically one above another, the large end of one being adjacent to the small end of the next, a supply-hopper supported by said frame above the larger end of the upper drum, a discharge-hopper below the lower drum, and fixed segmental screens arranged concentrically to said drums.

4. The combination of a supporting-frame, rotary conical roughened drums arranged vertically one above another, the large end of one being adjacent to the small end of the next, a supply-hopper supported by said frame above the larger end of the upper drum, a discharge-hopper below the lower drum, fixed segmental screens arranged concentrically to said drums, and screening-collecting boxes on either side of said discharge-hopper.

5. The combination of a supporting-frame, rotary conical roughened drums arranged vertically one above another, the large end of one being adjacent to the small end of the next, a supply-hopper supported by said frame above the large end of the upper drum, fixed segmental screens arranged concentrically to said drums, and a fan-blast located adjacent to the spout of said discharge-hopper.

In testimony that I claim the foregoing as my invention I have signed my name in presence of two subscribing witnesses.

JAKOB QUILLMANN.

Witnesses:
MARTIN PETRY,
CARL KARP.